(No Model.)   5 Sheets—Sheet 3.
L. HIRSCHFELD.
MACHINE FOR DEPOSITING CONFECTIONERY INTO MOLDS.
No. 530,417.  Patented Dec. 4, 1894.
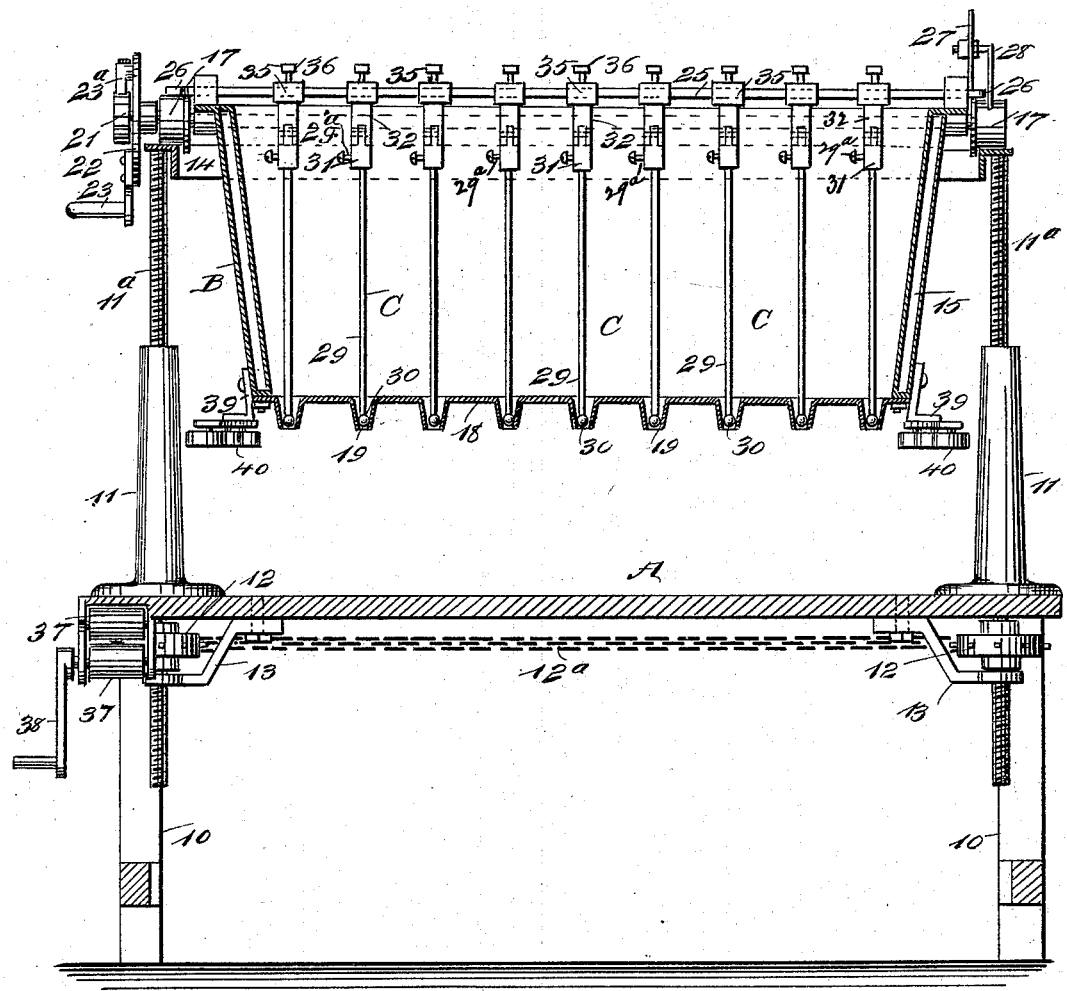
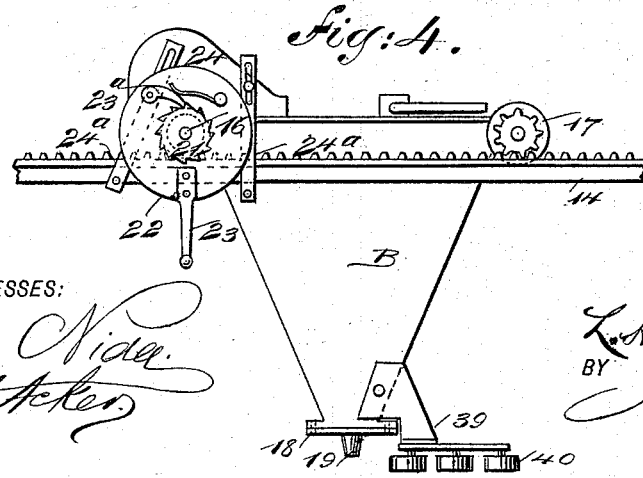
WITNESSES:
INVENTOR
L. Hirschfeld
BY
Munn & Co.
ATTORNEYS.

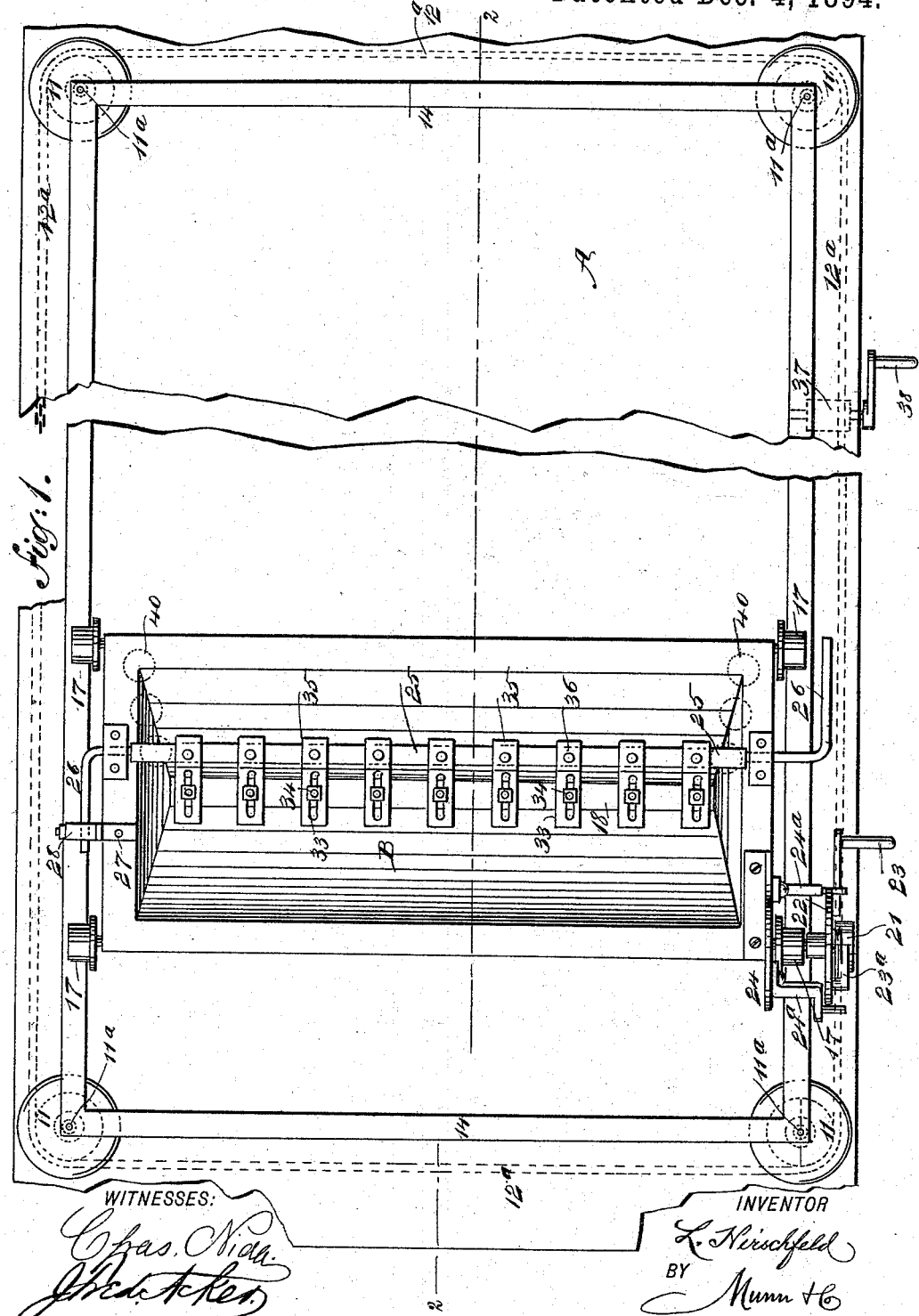

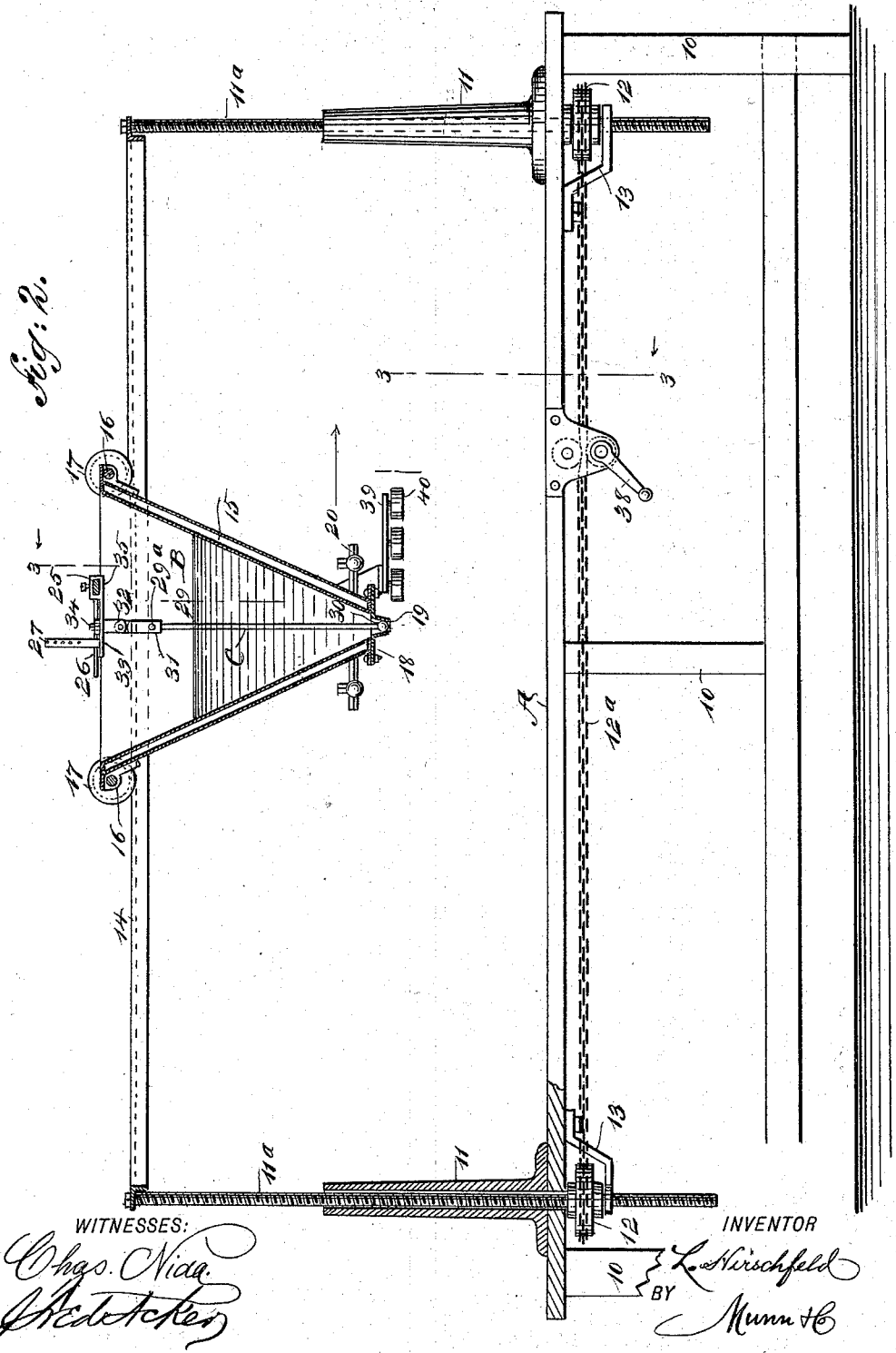

(No Model.) 5 Sheets—Sheet 4.

L. HIRSCHFELD.
MACHINE FOR DEPOSITING CONFECTIONERY INTO MOLDS.

No. 530,417. Patented Dec. 4, 1894.

WITNESSES:
Chas. Nidu.
C. Sedgwick

INVENTOR
L. Hirschfeld
BY Munn & Co
ATTORNEYS.

(No Model.)  5 Sheets—Sheet 5.
L. HIRSCHFELD.
MACHINE FOR DEPOSITING CONFECTIONERY INTO MOLDS.
No. 530,417.  Patented Dec. 4, 1894.
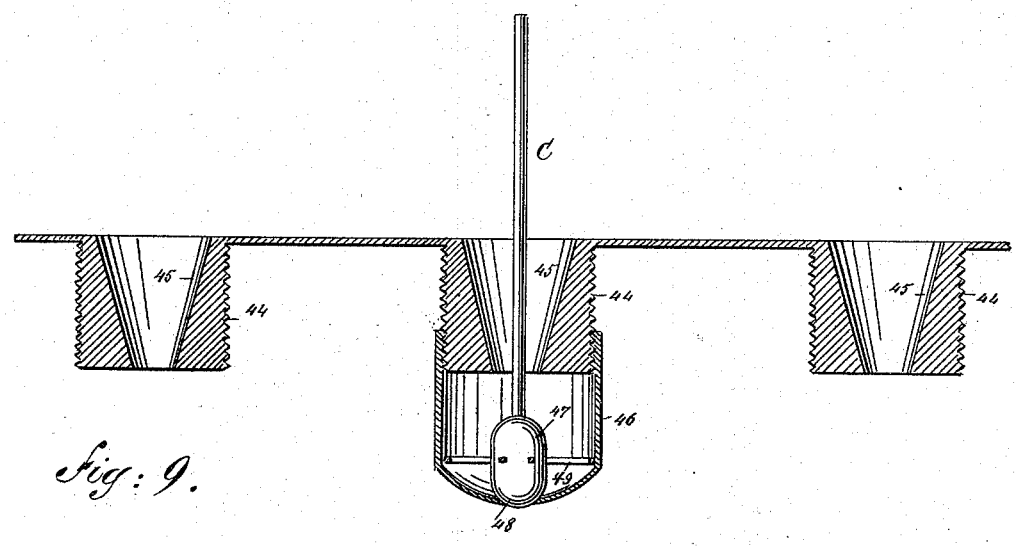
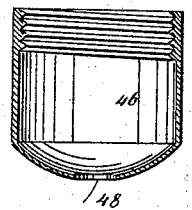
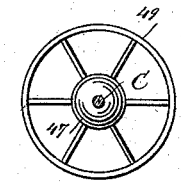
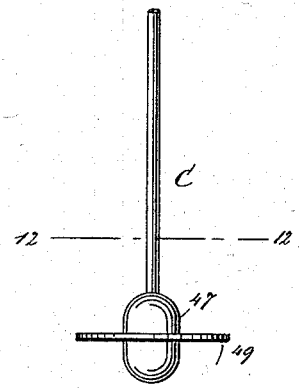
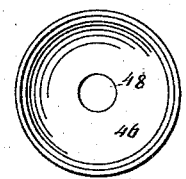
WITNESSES:
INVENTOR
ATTORNEYS.

UNITED STATES PATENT OFFICE.

LEO HIRSCHFELD, OF NEW YORK, N. Y., ASSIGNOR OF ONE-HALF TO JULIUS STERN AND JACOB SAALBERG, OF SAME PLACE.

MACHINE FOR DEPOSITING CONFECTIONERY INTO MOLDS.

SPECIFICATION forming part of Letters Patent No. 530,417, dated December 4, 1894.

Application filed July 24, 1894. Serial No. 518,489. (No model.)

*To all whom it may concern:*

Be it known that I, LEO HIRSCHFELD, of New York city, in the county and State of New York, have invented a new and useful Improvement in Machines for Depositing Confectionery into Molds, of which the following is a full, clear, and exact description.

My invention relates to a machine for depositing confectionery into molds, and it has for its object to construct such a machine in a manner which will enable the mold to be held stationary while a carriage containing the confectionery to be deposited will be moved over the molds until all of them are filled; and a further object of the invention is to provide a means whereby a number of molds may be placed one on top of the other, and the carriage adjusted vertically to deposit confectionery as accurately in the uppermost as in the lowermost of the molds.

Another object of the invention is to provide a carriage so constructed that the valves may be changed conveniently and expeditiously to correspond in number to the number of molds placed in line in a box, and whereby likewise the valves will be made to accommodate themselves to any slight inaccuracy with regard to their arrangement upon the carriage, insuring a complete closing of all of the discharge openings in the carriage when such a closure is desired.

Another object of the invention is to provide means for simultaneously adjusting all the supports for the carriage, and a means likewise whereby the feed of the carriage may be changed and whereby all of the valves may be opened or closed simultaneously.

The invention consists in the novel construction and combination of the several parts, as will be hereinafter fully set forth and pointed out in the claims.

Reference is to be had to the accompanying drawings, forming a part of this specification, in which similar figures and letters of reference indicate corresponding parts in all the views.

Figure 5:
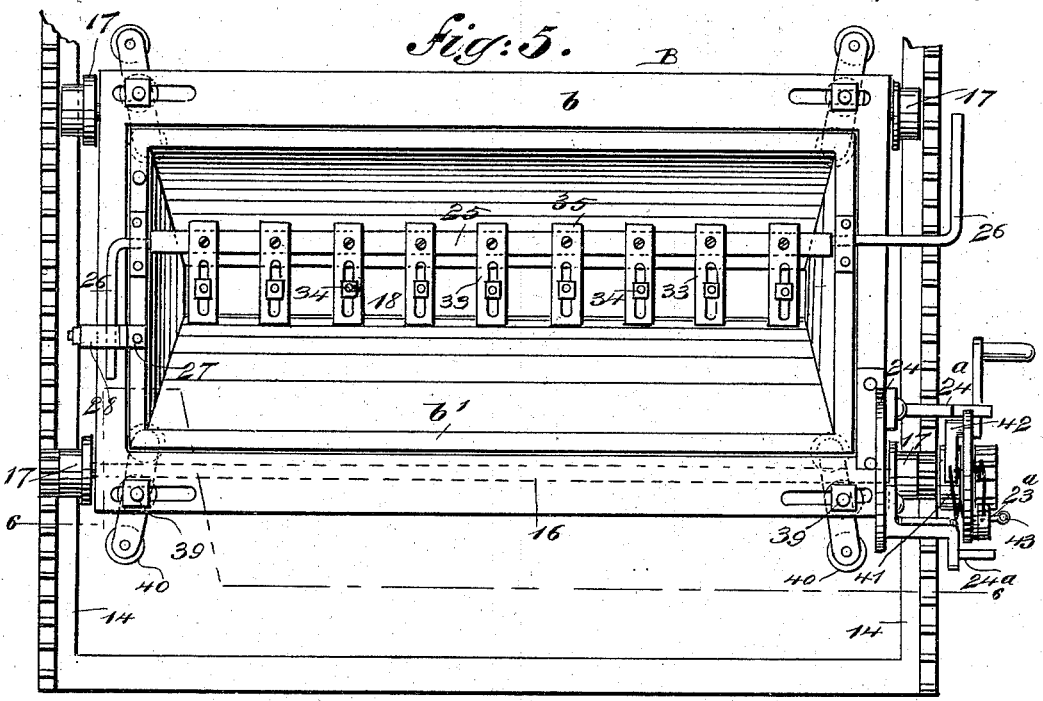
Figure 6:
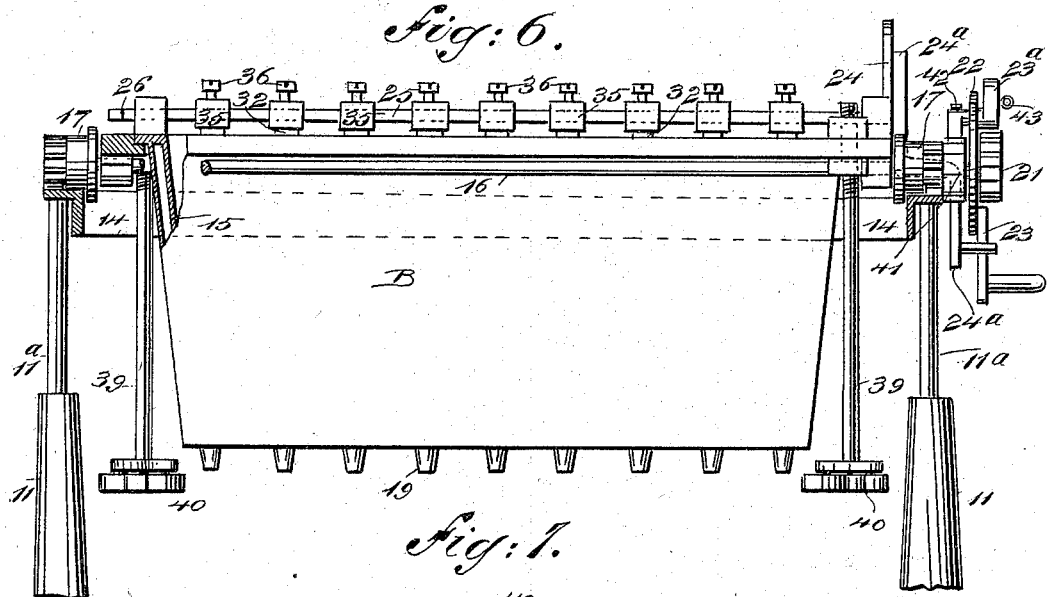
Figure 7:
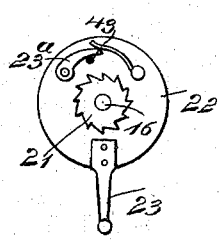

Figure 1 is a plan view of the machine, parts being broken away. Fig. 2 is a longitudinal vertical section, taken essentially on the line 2—2 of Fig. 1. Fig. 3 is a transverse section taken essentially on the line 3—3 of Fig. 2; and Fig. 4 is a side elevation of the carriage and a portion of the track upon which it is adapted to travel. Fig. 5 is a plan view of the carriage and a portion of the track, illustrating a modification in the construction of the carriage, the trough being removable therefrom, and the carriage is capable of being propelled forwardly or rearwardly as desired. Fig. 6 is a section taken essentially on the line 6—6 of Fig. 5. Fig. 7 is a detail side elevation of the propelling disk. Fig. 8 is a section taken through the bottom of the carriage, illustrating a modified form of the valve seats therein. Fig. 9 is a detail sectional view of one of the reservoirs connected with the valve seats. Fig. 10 is a plan view of the said reservoir. Fig. 11 is a detail view of the valve; and Fig. 12 is a section taken substantially on the line 12—12 of Fig. 11.

In carrying out the invention a table A, is employed, provided with suitable supports or legs 10, and upon this table, usually at each corner, a socket 11 is erected of predetermined height. An exteriorly threaded shaft $11^a$, is passed loosely through each socket and likewise through the table, and each shaft below the table is provided with a nut in the shape of a sprocket wheel 12, held in place beneath the table by means of a bracket 13. By rotating the wheels 12, the hubs of which are threaded to correspond to the thread of the shaft, the said shaft may be raised or lowered; and the simultaneous elevation or depression of all of the shafts is accomplished through the manipulation of a chain belt $12^a$, which runs upon all of the sprocket wheels or nuts 12. The four threaded upright shafts $11^a$, are adapted to support a track 14, preferably of rectangular form, and the side tracks, which are usually longer than the end tracks, are preferably provided upon their upper surfaces with teeth, the said upper surfaces being practically rack surfaces. The frame or track is adapted to support a carriage B, and this carriage consists of a trough body, practically V-shaped in cross section, having double walls whereby a space 15, is provided, in which hot water, steam or other heating agent, may be supplied for the purpose of keeping the confectionery to be carried by the trough body in a liquid form.

Shafts 16 are passed through suitable bearings located at each side of each end of the trough body, and the said shafts carry at each of their ends supporting wheels 17, which are toothed when the side tracks of the frame upon which they rest are toothed; and the said wheels are provided with a plain periphery when the tracks are given that formation upon their upper faces. The shafts 16 may be made singly for each wheel, or they may extend from end to end of the carriage, carrying a wheel at each extremity. Each supporting wheel is preferably provided with a flange at its inner end in order that the carriage shall be guided and travel straight when carried from end to end of the track frame. The bottom 18 of the trough body is removable, and the said bottom is provided with a series of preferably conically-shaped valve seats 19, the number of the said seats corresponding to the number of molds arranged in a row in the box or other support provided for them, and steam, or hot water, or air, is supplied to the jacket 15 by means of suitable pipes 20.

The carriage is moved a predetermined distance along its track support, preferably by securing upon one end of what may be termed the rear shaft 16 a ratchet wheel 21, as shown in Figs. 1, 3 and 4. A disk 22, is likewise carried at this end of the shaft, the disk being loosely mounted, and it is provided with a handle 23 whereby it is turned, and a spring-controlled dog 23$^a$, adapted for engagement with the ratchet wheel. At this end of the carriage a shield 24, is erected, adapted to carry guides 24$^a$. These guides are adjustably attached to the outer face of the shield, one at each side of the shaft, and are usually made angular in general contour, since they are to extend downward over the outer edge of the side track as shown in Fig. 1; and the movement of the carriage is brought about by carrying the handle in direction of one of the guides 24$^a$, at which time the dog will engage with the ratchet wheel and feed the carriage forward a distance corresponding to the throw of the handle, and upon the movement of the handle in the opposite direction the dog will slide over the ratchet and have no effect upon the carriage.

It is evident that the guides 24$^a$ may be adjusted to admit of the carriage feeding forward at each driving operation a considerable distance, or it may be made to travel but a slight distance only.

A valve-controlling bar 25, is journaled at its ends upon the upper end portions of the trough body of the carriage. Said bar, between its journals, is preferably made flat or polygonal in cross section, as shown in Fig. 2, and is located at one side of the center of the trough. This valve-controlling bar is provided at each end with a crank arm 26, the said arms being carried in opposite directions, one for example over the right-hand rail of the carriage support; and by depressing this latter crank arm the valve-controlling bar may be rocked so as to raise or lower whatever may be attached to it, this rocking movement being limited by the opposite arm 26 engaging with a limiting bracket 28, adjustable upon a standard 27, the standard being attached to the end of the carriage, usually the left-hand end.

The valves C, which are carried by the valve controlling bar, each consist of a stem 29, having a head formed upon its lower end, said head being preferably in the nature of a ball, and it is adapted to enter one of the conical seats 19 in the removable bottom of the carriage. The upper end of the valve stem is attached by a set screw 29$^a$, to a block 31, which has a hinged or pivotal connection with a second block 32. This upper block, through the medium of a set screw 34, or its equivalent, is adjustably held in an adjusting bar or plate 33, provided at one end with a socket 35, receiving the valve-controlling bar 25 and fitting snugly thereto, yet the plate 33 is adjustable upon the valve controlling bar, and can be fixed at any point thereon through the medium of a set screw 36, passed through its socket 35. Thus it will be observed that the valves can be shifted to accommodate a bottom plate having a greater or less number of seats than that shown in the drawings; and furthermore that the valve stem is adjustable horizontally upon its supporting plate 33, in a manner to bring the valve head 30 in proper contact with a seat 19, and the pivotal connection between the blocks 31 and 32 of a valve stem enables the same to be drawn upward without virtually changing the position of the stem relative to the valve supports in conjunction with which its head operates.

It is also evident that by moving one of the crank arms 26 of the valve-supporting bar 25 all of the valves may be simultaneously raised and lowered.

The adjustment of the valve stems upon the adjusting plates 33 is clearly shown in Fig. 1.

In order that the vertical adjustment of the frame may be conveniently made, friction rollers 37, are journaled in suitable brackets at one side of the table A, one above the other below the chain 12$^a$ and in contact therewith, the lower roller being operated by a crank arm 38.

In the operation of this machine the boxes containing the molds are designed to be placed upon the table A, one upon the other, and as the molds in the upper box are filled that box is removed and the carriage is adjusted to fill the molds in the next box. It sometimes happens, however, that the boxes are not piled straight one upon the other, and as the carriage is moved forward the valves would not register properly with the molds. Therefore, in order to automatically straighten the boxes so that a proper registry may be obtained, an arm 39, is projected horizontally from each end of the carriage at the front, the arms having an outward inclination, and the said arms carry friction rollers 40, and these rollers will engage with any box that extends over another to any detrimental degree and will straighten the box in advance of the valves reaching the molds.

In Figs. 5 and 6 I have illustrated the carriage as comprising an outer frame $b$, to which the propelling mechanism is attached, and the frame is of rectangular construction, and its inner end is rabbeted to receive a flange formed upon the trough, which in this case is designated as $b'$, thus enabling the trough to be removed and another substituted, if desired. In the said Figs. 5 and 6 I have also illustrated the friction rollers 40, serving as guides for the carriage, as having their supporting arms 39 adjustably attached to the frame section $b$ of the carriage, and in many instances this form of carriage and manner of attaching the rollers are preferred.

In the forms of carriage shown in the other views, the carriage is capable of being fed forward in one direction only. It is frequently necessary, or very convenient, to have the carriage capable of being fed either forward or rearward. Therefore, in Figs. 5 and 6, a second ratchet wheel 41, is secured upon the same shaft as the ratchet wheel 21, but at the opposite side of the actuating disk 22, and the teeth of the two ratchet wheels are oppositely inclined, and the inner ratchet wheel 41, is engaged by a spring-pressed dog 42, pivoted upon the inner face of the said actuating disk, and one or the other of the pawls $23^a$ and 42 is held out of engagement with its ratchet wheel according to the direction in which the carriage is to travel, and this may be accomplished in any approved manner. In the drawings a pin 43, is employed to hold the dog elevated, as shown also in Fig. 7.

It is often desirable that the trough of the carriage should be provided with valves capable of regulating the amount of liquid to be dispensed, that is to say, the valves shall be so constructed that when opened a certain amount of liquid will be contained in the reservoir, and whereby when the valves are closed the liquid will be discharged from the reservoir. To that end a sleeve 44 is attached to or is made integral with the bottom of the trough of the carriage wherever the discharge is to be made, and the said sleeve is provided with a conical chamber 45, open at top and bottom, and in the conical chamber of each sleeve a valve stem C is held to reciprocate provided with a head 47, capable of closing the reduced or lower portion of the chamber. The head 47 is preferably made somewhat oblong, and each sleeve 44 is exteriorly threaded, and has screwed upon it a cap or receiver 46, provided with an opening 48 in its lower end, the said valve head 47 being capable of closing the chamber 45; and by manipulating the cap or receiver 46 its depth can be regulated, and the said cap made to contain more or less of liquid.

In order that the sugar shall not stick to the walls of the receiver 46, a ring-like scraper 49, is secured upon the head 47 of each valve, adapted to contact with the inner wall of a receiver and remove any matter that might adhere to said wall.

In operation, when the head 47 of the valve closes the chamber 45 of the sleeve, the opening 48 in the receiver will be uncovered, and any liquid that may be contained therein will escape; and when the head of the valve closes the opening 48 in the receiver, the chamber 45 will be opened, and it will empty the contents of the trough into the receiver until it is full, whereupon the valve is made to close the chamber 45 and discharge the contents of the receiver through its opening 48.

Having thus described my invention, I claim as new and desire to secure by Letters Patent—

1. A machine for depositing confectionery into molds, the same consisting of a table, a track located above the table, and adjustable vertically toward and from the table and a trough or tank held to travel upon the said track, the trough being provided with discharge valves and means for operating said valves, substantially as shown and described.

2. In a machine for depositing confectionery into molds, a table, a track adjustably held above the table, and a carriage adapted to carry the confectionery, held to travel upon the track over the table, valves located in the carriage, means for operating the said valves, substantially as shown and described, and a feed mechanism whereby the carriage is made to travel a predetermined distance at each operation of the feed, as and for the purpose set forth.

3. In a machine for depositing confectionery into molds, a track, screw shafts supporting the track, nuts located upon the shafts, and an endless chain belt by means of which the nuts on the screw shafts are simultaneously operated, and a carriage provided with a receptacle adapted to contain confectionery, held to travel upon the track over the table, the said carriage being provided with valves, and means for simultaneously operating all of the valves, as and for the purpose specified.

4. In a machine for depositing confectionery into molds, the combination, with a table, a track located above the table, and supports for the track, vertically adjustable, of a carriage held to travel on said track, provided with a trough-like body having valve seats at its bottom portion, a valve-controlling rod, and valves adjustably carried by the said rod and entering the said seats, substantially as shown and described.

5. In a machine for depositing confectionery into molds, a table, a track adjustably supported above the table, a carriage provided with a receptacle adapted to contain confectionery and held to travel on the tracks, valves controlling the outlets in the carriage, and guides having outward inclination and located upon the forward face of the carriage, as and for the purpose specified.

6. The combination with the receptacle or trough provided in its bottom with threaded outlet nipples or sleeves and caps screwed upon the nipples or sleeves and having apertures in their bottoms, of valve stems extending down through the nipples or sleeves into the caps or receivers and there provided with valves having scrapers thereon to engage the interior of the said caps, said valves closing the nipples or sleeves and opening the caps in their upward movements and in their downward movement opening the nipples or sleeves and closing the caps or receivers.

7. In a machine for depositing confectionery into molds, a receptacle adapted to contain confectionery, provided with removable valve seats in its lower portion, a valve-manipulating rod journaled upon the said receptacle, having bars or plates adjustable thereon and located at intervals apart corresponding to the intervals between the valve seats, valve stems terminating in valves, the latter being adapted to enter the said seats, and the stems being adjustable upon the said plates or bars, substantially as shown and described.

8. In a machine for depositing confectionery into molds, a receptacle adapted to contain confectionery, provided with removable valve seats in its lower portion, a valve-manipulating rod journaled upon the said receptacle, having bars or plates adjustable thereon, and located at intervals apart corresponding to the intervals between the valve seats, and valve stems terminating in valves, the latter being adapted to enter said seats, the stems being adjustable upon the said plates or bars and made to terminate at their upper ends in two pivotally connected blocks, whereby the valve-manipulating bar may be raised or lowered, or shifted without disturbing the relation between the valves and their seats, as and for the purpose specified.

LEO HIRSCHFELD.

Witnesses:
A. ARNS, Jr.,
A. ARNS.